US006411991B1

(12) United States Patent
Helmer et al.

(10) Patent No.: US 6,411,991 B1
(45) Date of Patent: *Jun. 25, 2002

(54) GEOGRAPHIC DATA REPLICATION SYSTEM AND METHOD FOR A NETWORK

(75) Inventors: Jon Scott Helmer, Lenexa, KS (US); Terry Lee Oehrke, Lee's Summit; Steven Frank Davis, Kansas City, both of MO (US); Scott Christopher Wells, Austin, TX (US)

(73) Assignee: Sprint Communications Company L.P., Overland Park, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,389

(22) Filed: Sep. 25, 1998

(51) Int. Cl.[7] .............................................. G06F 15/16
(52) U.S. Cl. ........................ 709/217; 707/202; 707/204
(58) Field of Search ................................ 709/217, 218, 709/219, 201, 203; 707/8, 201, 202, 203; 714/4

(56) References Cited

U.S. PATENT DOCUMENTS

| | | | |
|---|---|---|---|
| 4,914,570 A | | 4/1990 | Peacock |
| 5,555,371 A | * | 9/1996 | Duyanovich et al. ........... 714/13 |
| 5,613,106 A | * | 3/1997 | Thurman et al. ............ 707/204 |
| 5,689,706 A | * | 11/1997 | Rao et al. .................... 707/201 |
| 5,713,017 A | * | 1/1998 | Lin et al. ........................ 707/8 |
| 5,745,753 A | * | 4/1998 | Mosher, Jr. .................. 707/202 |
| 5,751,955 A | | 5/1998 | Sonnier et al. |
| 5,765,171 A | * | 6/1998 | Gehani et al. ............... 707/203 |
| 5,781,550 A | | 7/1998 | Templin et al. |
| 5,781,912 A | * | 7/1998 | Demers et al. .............. 707/202 |
| 5,794,253 A | * | 8/1998 | Norin et al. ................. 707/203 |
| 5,815,668 A | * | 9/1998 | Hashimoto ................... 709/238 |
| 5,838,894 A | | 11/1998 | Horst |
| 5,867,667 A | | 2/1999 | Butman et al. |
| 5,870,552 A | | 2/1999 | Dozier et al. |
| 5,870,558 A | | 2/1999 | Branton, Jr. et al. |
| 5,894,554 A | | 4/1999 | Lowery et al. |
| 5,948,108 A | | 9/1999 | Lu et al. |
| 5,950,198 A | * | 9/1999 | Falls et al. ....................... 707/8 |
| 5,974,563 A | * | 10/1999 | Beeler, Jr. ....................... 714/5 |
| 5,982,891 A | | 11/1999 | Ginter et al. |
| 6,026,433 A | | 2/2000 | D'Arlach et al. |
| 6,035,307 A | * | 3/2000 | Martin et al. ................ 707/101 |
| 6,055,522 A | | 4/2000 | Krishna et al. |
| 6,065,018 A | * | 5/2000 | Beier et al. .................. 707/201 |
| 6,092,086 A | * | 7/2000 | Martin et al. ............... 707/202 |
| 6,125,388 A | * | 9/2000 | Reisman ...................... 709/218 |
| 6,134,584 A | | 10/2000 | Chang et al. |
| 6,144,999 A | * | 11/2000 | Khalidi et al. .............. 709/219 |
| 6,199,082 B1 | | 3/2001 | Ferrel et al. |
| 6,202,093 B1 | | 3/2001 | Bolam et al. |
| 6,208,986 B1 | | 3/2001 | Schneck et al. |
| 6,240,105 B1 | * | 5/2001 | Zetts ........................... 370/216 |

OTHER PUBLICATIONS

Veritas Software Corporation, "Veritas Storage Replicator for File Systems–White Paper," Veritas, (Feb. 2, 1998).
Rdist Man Page http://www.arachna.com/webservers_man.html, No date.*
Getting Started with PC–Rdist http://www.pyzzo.com/pcrdist/1x/docs/start.shtml, No date.*

* cited by examiner

Primary Examiner—Mehmet B. Geckil
(74) Attorney, Agent, or Firm—Harley R. Ball; Steven J. Funk; Kevin D. Robb (57) ABSTRACT

A system and method for replicating temporary data created by a server is provided. Temporary data for a local server is replicated periodically to a remote server. Temporary data for the remote server is also periodically replicated to the local server. If a server fails, another server begins processing user requests not responded to by the failed server. The user requests are processed with the benefit of the replicated temporary data. Repetitive user input and processing to create and process the temporary data is not required.

12 Claims, 3 Drawing Sheets

GEOGRAPHIC DATA REPLICATION SYSTEM AND METHOD FOR A NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention generally relates to computer networks. In particular, the invention relates to Internet and intranet computer systems.

2. Description of the Prior Art

The Internet is an international network of interconnected government, education, and business computer networks. A person at a computer terminal or personal computer with the proper software communicates through the Internet by placing data in an Internet protocol (IP) packet with an address for a particular destination on the Internet. Using Transmission Control Protocol (TCP), transport of the packet is managed. Communication software on processors or routers on the intervening networks between the source and the destination network read the address assigned to the packet and forward the packets towards their destination.

Intranets are typically corporate networks that use the same networking or transport protocols as the Internet. Typically, dedicated servers provide access to corporate information in a cohesive fashion. For example, documents are stored in a HyperText Markup Language (HTML), and users of the intranet network use web browser software to obtain access to the documents. Thus, both the Internet and intranets may be IP networks.

The IP network allows a user to gain access to various applications and related data. For example, a user with web browser software enters an address of a desired application. The address and the user's request for access is then routed through the IP network or a plurality of IP networks to an application server at the requested address. The user may then request further information such as an HTML document. Using HyperText Transport Protocol (HTTP), HTML documents are communicated to the user. The documents or other application information comprise content, such as a Intranet web page, graphics or information representing various text and graphics associated with a company and its services.

Various groups provide the servers and associated applications. For example, a corporation provides a content server for access to information about that corporation by users through the IP network. Multiple servers, each geographically remote to the other, may run the same applications for more efficient data retrieval. However, these servers operate independently.

As an application server responds to user requests, various temporary data is generated. The temporary data may include user selections, other user input information, status information associated with the application processing, or application generated information used for further processing. However, if the application server or associated memory fails, the temporary data may be lost.

SUMMARY OF THE INVENTION

The present invention is directed to a geographic data replication system and method. According to one feature of the invention, temporary data for a local server is replicated periodically to a remote server. According to a second feature, the temporary data for the remote server is replicated to the local server. Replication includes copying temporary data to file servers associated with the local and remote servers. Advantageously, an architecture according to the present invention allows for about 100% service availability. If a server fails, such as the local server, the remote server begins processing user requests based on the temporary data it received from the local server. Failure of a server may not result in failure of services or loss of previously generated temporary data.

In a particular first aspect of the invention, a method and associated system provide geographic data replication. Temporary data is stored on a first active file server. The first active file server is geographically remote from a second active file server. The temporary data associated with the first active file server is replicated to the second active file server.

In a second aspect of the invention, a system and associated method provide geographic data replication. The same content is provided with first and second application servers. The first application server is geographically remote from the second application server. First and second sets of temporary data associated with the content and with the first and second application servers, respectively, are replicated to the second and first application servers, respectively.

DETAILED DESCRIPTION OF PREFERRED EMBODIMENTS

Figure 1:
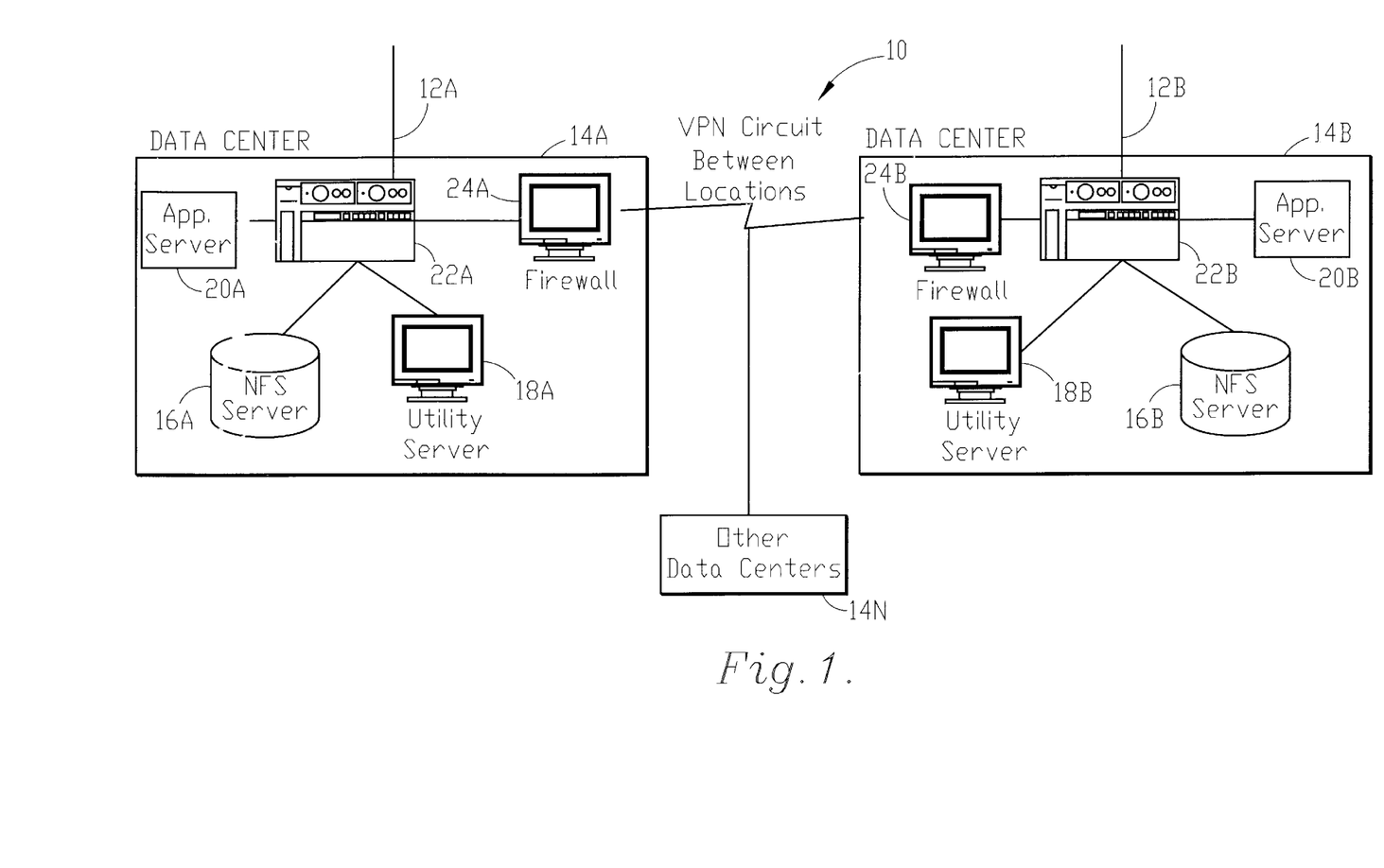
FIG. 1 is a schematic block diagram of one embodiment of a processing and data replication architecture in accordance with the present invention.
Figure 2:
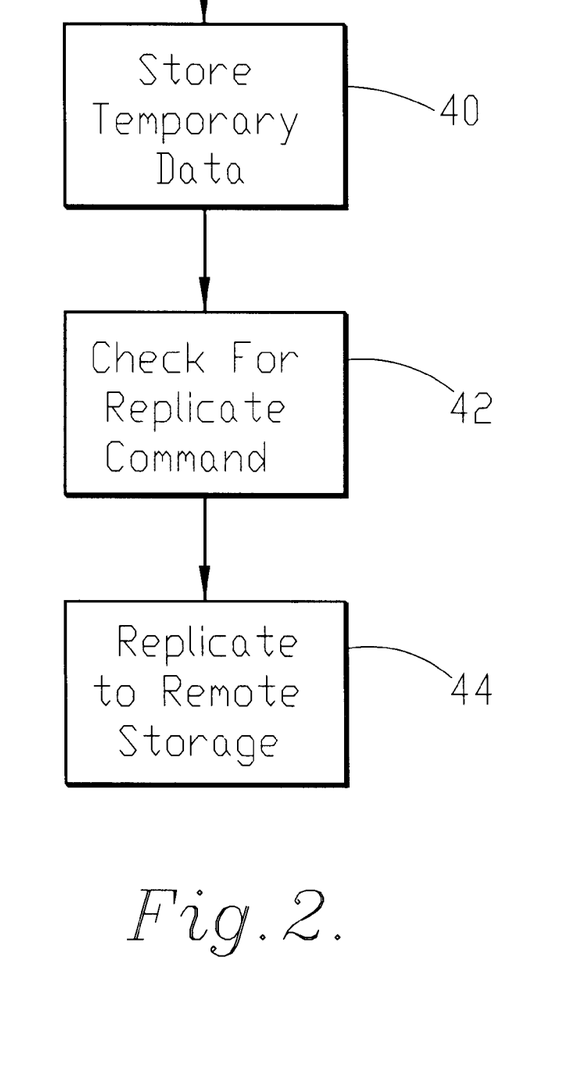
FIG. 2 is a flow chart diagram of one embodiment of a data replication method for use on the architecture of FIG. 1.
Figure 3:
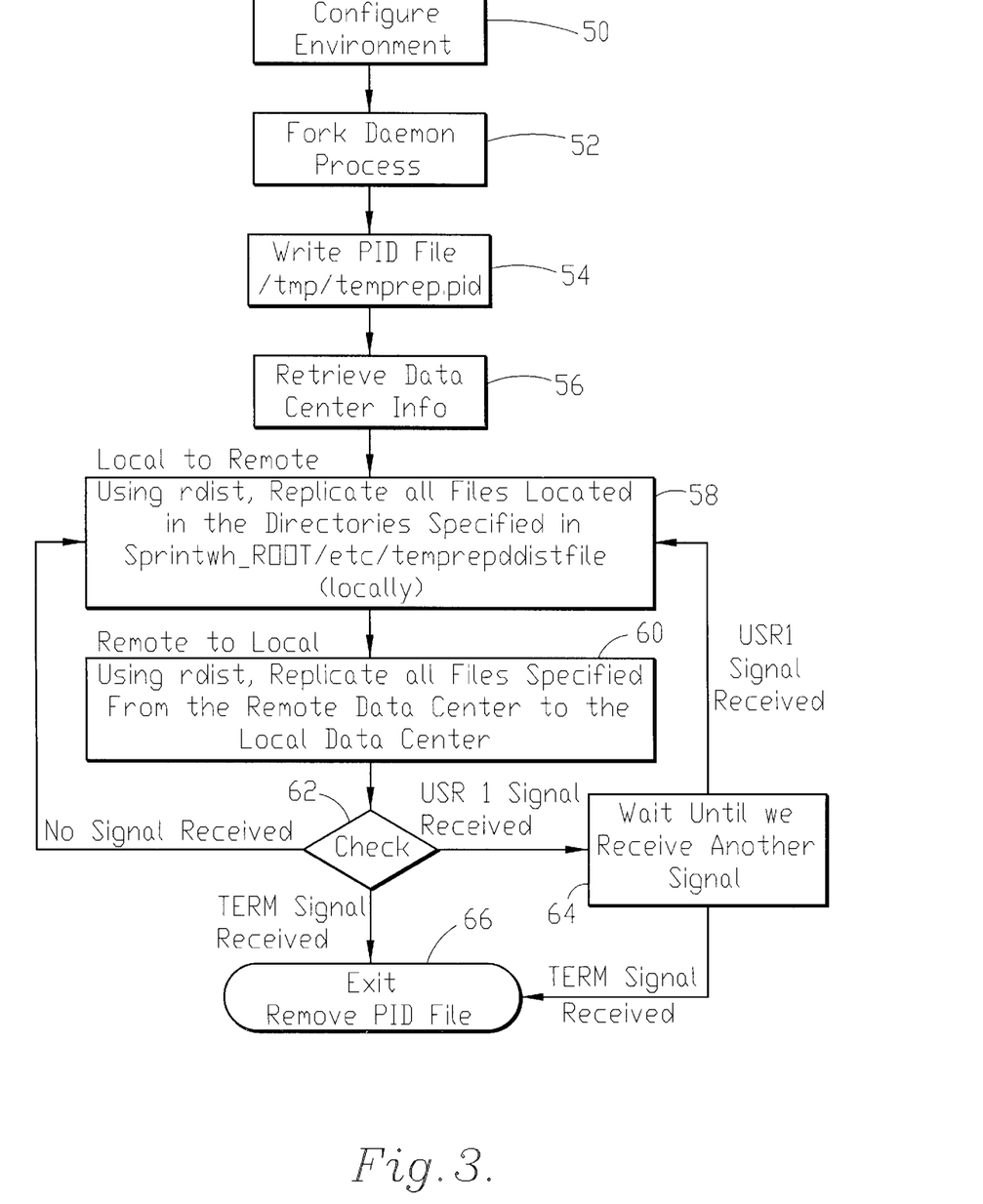
FIG. 3 is a flow chart diagram of one embodiment for implementing the data replication method of FIG. 2.

Referring to FIGS. 1–3, embodiments of a system and associated methods for replicating temporary data are shown. The temporary data associated with at least two geographically remote servers is replicated between the servers. If a server generates temporary data associated with a user, such as identifying selected shopping items, the temporary data is replicated to a remote server. If the local server fails, the user request is routed to the remote server. The remote server processes the request with the benefit of the previously generated temporary data. Temporary data, such as data identifying the selected shopping items, is applied by the remote server without repetitive user input or processing. Therefore, about 100% service availability is provided.

Referring now to FIG. 1, a schematic block diagram of one embodiment of a processing and data replication architecture is shown generally at 10. Network 10 comprises data centers 14A and 14B and lines 12A and 12B. Each line 12A and 12B connects to a data center 14A and 14B, respectively. Data center 14A is geographically remote from data center 14B. Geographically remote components include components connected to a Wide Area Network (WAN), through two or more switches, or components housed in structures at different geographic locations. For example, data center can be located in San Jose, Calif. and data center 14B can be located in Relay, Md. Data centers 14A and 14B may comprise a WAN or a portion of a WAN. While only two data centers 14A and 14B are shown, more data centers may be provided, such as data centers 14N. Various components within each data center 14A and 14B are preferably located proximate to each other, such as in Local Area Networks (LANs), but may be dispersed in various geographical regions.

Each data center 14A and 14B preferably includes at least one file server 16A and 16B, one utility server 18A and 18B, and one application server 20A and 20B operatively connected to at least one switch 22A and 22B. Switches 22A and 22B also operatively connect to lines 12A and 12B, respectively, and firewalls 24A and 24B, respectively. Data center 14A and 14B may comprise more or fewer components, such as only an application server and associated memory. Furthermore, redundant components and associated connections and interfaces may be provided within each data center 14A and 14B. In one preferred embodiment, each data center 14A and 14B comprises the data centers disclosed in U.S. application Ser. No. 09/021,466, filed Feb. 10, 1998. for a Survivable scalable Data System And Method For Computer Networks, the disclosure of which is herein incorporated by reference.

Through an intranet or Internet or other network connection, a user request is routed to architecture 10 on one of lines 12A or 12B. For example, a TCP/IP or other protocol request is routed to line 12A. At any given time, one or more requests are routed lines 12A and 12B. For example, the routing may be performed in accordance with the system and method disclosed in U.S. patent application Ser. No. 09/021,091 for a Method And System For Network Routing, filed Feb. 10, 1998, the disclosure of which is herein incorporated by reference. Architecture 10 generates responses to the requests and places the responses on one of lines 12A or 12B for routing back to the user.

The requests are provided on lines 12A and 12B to switches 22A and 22B, respectively. Reference will be made below to components of data center 14A, but the discussion applies to the same or similar components of data center 14B. Preferably, the corresponding components of each data center are the same type of device, but different types of devices may be used in each data center 14A and 14B.

Switch 22A comprises a network switch operating under the control of any of various software applications, such as a Catalyst 5000 Ethernet switch by CISCO (Dual Power Supply, 2 Supervisor Modules, 8 Fast Ethernet Modules). Switch 22A transfers data among the various components of data center 14A. Various transport formats, such as asynchronous transfer mode (ATM), Fiber Distributed Data Interface, or fast switched Ethernet formats, may be used. Preferably, a fast Ethernet transport format is used. The connections between the various components may be duplicative Ethernet connections and may be encrypted in a Level 2 Forwarding (L2F) format, other formats, or not encrypted. For example, each connection is a 100 Mb Fast Ethernet connection. Other connections and formats, such as Level 2 Transfer Protocol or Point-to-Point Tunneling Protocol, may be used. Other switches 22A or other means for connecting various components within data center 14A may be used, such as direct connections.

Switch 22A transfers information from or to firewall 24A. Firewall 24A comprises a server with firewall software, such as a Sun Ultra 2 server (300 Mhz, 256M Ram, two 2 GB drives and two Fast Ethernet Adapters) running Raptor Eagle Software. Other servers from other manufacturers with the same or different software may be used. In one embodiment, firewall 24A is provided at data center 14A and secures write access into data center 14A.

There may be various connections to networks or components outside data center 14A proxied by firewall 24A. Preferably, firewalls 24A and 24B connect data centers 14A and 14B through a Virtual Private Network (VPN). Other network or communications connections may be used, such as ISDN, TCP/IP networks, or modem links. The VPN may comprise a back-end or private network for communications between various data centers. Lines 12A and 12B provide communications for public access.

Public access is provided to application server 20A. Application server 20A preferably comprises servers as known in the art, such as SUN SPARC (300 Mhz, 256M Ram, two 2 GB drives and two Fast Ethernet Adapters) computer processors each associated with a unique network address. Other servers or combinations of different servers may be used. Application server 20A represents one or more shared or dedicated servers for providing content information. Content is provided in response to requests, such as requests input on line 12A.

Content is associated with an application run on application server 20A and includes any information provided without alteration. The application may include any known service, such as, for example, mail, news, directory, groupware, CyberCash/DNS or other content providing applications. Groupware applications include any type of collaborative tool, such as video conferencing and whiteboard software. CyberCash requires communication with various financial institutions on the Internet. Therefore, queries from application server 20A for CyberCash information are preferably routed through a back-end interface and are proxied by a firewall, such as firewall 24A. The content associated with the applications may include web pages, lists, documents or other information.

Each application server 20A and 20B runs at least one of the same applications as the other. For example, both application servers 20A and 20B run a same news application. The news application may include processing associated with bulletin boards of current events and chat rooms, as known in the art. Application server 20A receives one or more requests related to customer content and application server 20B also receives one or more requests related to the same customer content.

Content and other data associated with each application is stored on file server 16A. File server 16A comprises one or more hard disk drives and associated processors or other data storage systems. For example, file sever 16A may include two devices configured for the Network File System (NFS) standard, such as Auspex NS7000 servers. In one preferred embodiment, file server 16A includes three Fast Ethernet interfaces with two connected to different interface cards within switch 22A. The other Fast Ethernet interface preferably connects to a standalone Fast Ethernet hub connected to switch 22A. A system active signal is transmitted on the interfaces connected to switch 22A as well as the interface connected to the Fast Ethernet hub.

Preferably, data stored on file server 16A is mirrored. The data is mirrored or copied to different locations on a drive, different drives or different cabinets. Any changes to the data are made to the mirrored data. Thus, identical or substantially the same data is provided in two locations within file server 16A. Additionally or alternatively, data is striped across multiple local drives. If one of the drives fail, the remaining drives continue to service requests for data that existed on the failed drive.

File server 16A is active. As used herein, active servers include servers operated to respond to requests or retrieve data for use by other components. For example, in the active mode, data for storage (i.e., writes) is transferred to file servers 16A or 16B and data from storage (i.e., reads) are serviced by file server 16A or 16B. Other servers may be in sleep or standby modes of operation.

In one embodiment, multiple sources of mirrored data within data center 14A are active. To further increase efficiency of storage space, both or more than one source of the same mirrored data is used to respond to queries. Upon any failure of one of the sources of mirrored data, such as no response within 5 milliseconds, the other source of the same mirrored data is available to respond to queries. Once the failed source of data is operational, the two mirrored sources of the same data are synchronized. After synchronizing to the same clock, the sources of the same data are synchronized to verify that the data is mirrored. Data from the recently failed file server 16A is verified against the source of mirrored data and updated as necessary. The recently failed and now operational file server 14A or source of data is then used to respond to queries, along with the other source of the same data. If more than one query associated with the same data is generated, then the queries are transferred to the same or different mirrored sources of the same data.

File server 16A is mounted by utility server 18A. Utility server 18A comprises a processor for controlling operation of data center 14A. In one preferred embodiment, utility server 18A comprises a Sun Ultra 2 running Unix or Solaris 2.5.1, but other servers and software may be used. More than one utility server 18A may be used in data center 14A.

Utility server 18A may provide data center 1 4A monitoring. Preferably, a separate remote management point or connection is provided. For example, the various components of data center 14A may be monitored for operational status over T-1 connections. Information associated with any hardware additions, deletions and reconfigurations may be provided to the appropriate components. Hardware management and/or administration of data center 14A may be through a remote or local access point.

Utility server 18A also controls adding, removing and changing various application processing and data storage. For example, storage and application processing for new or changed content is controlled. File server 16A and the appropriate application server 20A is provided data storage address information. Other controls, such as control over the switches, may also be provided through utility server 18A.

Utility server 18A controls replication of temporary data. As used herein, temporary data includes data generated by application server 20A, file server 16A, user input and any other data created during and associated with hosting network services. For example, html or data files created by CGI or other programs for processing user requests comprise temporary data files. For another example, temporary data includes log files generated after initiating data center 14A. As another example, user input information, such as associated with shopping selections or other user data, comprises temporary data for use hosting or providing content.

As yet another example, application server 20A generates queries in response to user requests. The queries comprise temporary data. For example, the requests correspond to a recent news article and application server 20A generates a query to obtain the news article. The queries are in any of various formats, such as Simple Mail Transfer Protocol (SMTP), Network News Transfer Protocol (NNTP), HyperText Transfer Protocol (HTTP), Calendar Access Protocol (CAP), File Transfer Protocol (FTP), and Lightweight Directory Access Protocol (LDAP). Other TCP/IP formats or other protocols may be used. The query is routed to file server 18A to obtain the news article. The query may be addressed for another server in application server 20A.

The temporary data is stored on file server 1 6A. Preferably, the temporary data is identified, in part, by application server 20A and customer or content, such as by storage in a customer or content directory. For example, application server 20A provides content associated with company XYZ. Temporary data associated with processing the content or other XYZ application is stored as XYZ data from application server 20A. As discussed above, data center 14B and other data centers comprise the same or similar components for generating, transferring and storing temporary data. For maximum service availability, the temporary data is replicated between data center 14A, 14B and any other data centers.

Replication is controlled by software on utility servers 18A and/or 18B. The software preferably comprises a Perl script daemon, but other languages may be used. In one embodiment, the software executes at one data center 14A (i.e., the local data center) to control replication of data generated by data centers 14A and 14B to other data centers 14B and 14A, respectively. The software described or other replication software may be implemented on both utility servers 18A and 18B or other servers, such as application servers 20A or 20B or file servers 16A or 16B.

Referring to FIG. 2, a representative flow diagram of one embodiment of a data replication method is shown. At step 40, the temporary data is stored at the data center 14A or 14B that generated the temporary data as discussed above.

At step 42, the software checks for a replicate command. The check and/or the command are preferably periodically performed or provided, respectively. The software activates (i.e., the software wakes) as a function of a time or event trigger. Preferably, the software activates every 15 seconds or some other predetermined amount of time. The software causes replication in response to activation.

At step 44, the temporary data is replicated between data centers 14A and 14B (see FIG. 1). Replication includes execution of a rdist on each customer's or application server's 20A and/or 20B temporary data directory. While the Unix system's rdist is used in one preferred embodiment, systems other than Unix using other utilities may be used. In this embodiment, rdist is executed at each data center 14A and 14B to copy temporary data. Preferably, only temporary data created or changed since the previous activation of the software is copied. In alternative embodiments, temporary data identified in other groupings or associated with different times is copied.

In one preferred embodiment, the temporary data is synchronized between data centers 14A, 14B. A change in the temporary data in either data center 14A, 14B results in a change in the temporary data of the other data center 14B, 14A. Any given temporary data may be originally changed in either data center 14A, 14B.

The copied temporary data is transferred to other data centers 14A, 14B or 14N. The temporary data is preferably transferred to and copied in all other data centers 14A, 14B through 14N, but may be transferred to one or other subset of data centers 14A, 14B through 14N. The temporary data is transferred through firewalls 24A and 24B over the VPN. The temporary data is transferred pursuant to the TCP/IP protocols, but other formats may be used. Reference will be made below to local data center 14A and remote data center 14B, but the discussion applies to additional remote data centers, such as through remote data center 14N.

In one embodiment, the replication software (i.e., the replication daemon) is executed in one data center 14A or 14B, such as the local data center 14A. The software generates a client process for running at a remote site for local operations and communication of results and other data to the replication software in the other remote data centers, such as remote data center 14B. Therefore, local data center 14A checks for and activates replication. In response, the client processes perform rdist or other replication utilities at the remote data center 14B, and rdist is also performed at the local data center 14A. The temporary data is copied and transferred between data centers 14A and 14B.

The temporary data associated with local data center 14A is copied to data center 14B. If data center 14A becomes unavailable, little or no temporary data is lost. Data center 14B begins processing user requests previously processed by data center 14A with little or no interruption. For example, data center 14A accepts user selections of various shopping items. The corresponding temporary data is replicated to data center 14B. When data center 14A is not available, data center 14B continues processing with the benefit of the temporary data showing the user selections. Since remote utility server 18B already mounts remote file server 16B, little delay is caused, such as delay to transfer data and for other priority processing. The user may not be required to reenter the selections.

If one data center 14A or 14B fails, user requests processed by the failed data center are routed to the other data center. Any routing technique may be used, including the routing disclosed in U.S. patent application Ser. No. 09/021,091 for a Method And System For Network Routing, filed Feb. 10, 1998. Therefore, the requests and the associated temporary data are available at the various data centers. A back-up utility server may be used to replicate temporary data if the primary utility server fails.

Referring to FIG. 3, a flow chart diagram of one embodiment for implementing the temporary data replication is shown. This embodiment preferably runs on a Unix system, but other systems may be used.

Prior to replication, the replication daemon executes various functions to enable replication. These enabling steps are performed once each time the system is turned on.

At step 50, the replication daemon configures various environmental variables, such as replication period or frequency, and labels identifying one of a plurality of configurations of directories and appropriate actions. The replication daemon also reads any command line arguments, such as variables overriding the default environmental variables, transferred to the replication daemon.

The replication daemon detaches from the Unix file descriptors. At step 52, a new process is created as a copy for running the replication in the background The new process is disassociated from the existing process group and the standard Unix file descriptors STDIN, STDOUT, and STDERR to allow undisturbed background processing. Disassociation creates multiple instances of replication capabilities at each data center 14A and 14B in a peer-to-peer relationship. In alternative embodiments, a master-slave relationship is used.

At step 54, the replication daemon writes the Process Identification (PID) number of the replication daemon to a designated file. Using this PID, the replication daemon is controlled and monitored with various signaling or other management processing.

Data center information is retrieved in step 56. The host name (i.e., the address) of each utility server 18A and 18B (see FIG. 1) in each data center 14A and 14B for receiving replicated temporary data is listed in a file. The replication daemon obtains a copy of the file.

Once the replication daemon enables replication, the process enters a loop. For each activation, the loop is processed starting at step 58. At step 58, the replication daemon identifies and copies the appropriate temporary data for application servers 20A within local data center 14A. Preferably, new, newer than previous copies, or newer than temporary data stored at remote data center 14B is copied. The copy of the temporary data is stored (i.e., the data is pushed or transferred) to one, all, or a sub-set of remote data centers, such as data center 14B.

In one embodiment, UNIX utility rdist version 6.1.3 from University of Southern California transfers the temporary data, but other software for identifying and transferring data may be used. The temporary data may be substantially simultaneously or sequentially transferred or broadcast to multiple data centers. In one embodiment, acknowledgment of complete transfer of data is provided. Preferably, the replication process continues while waiting for acknowledgment from each remote data center 14A or 14B. Without waiting for acknowledgment, delays associated with broadcast transfers over a WAN are avoided.

Once the temporary data from local data center 14A is transferred to remote data center 14B, the temporary data from one, all, or a sub-set of remote data centers 14B is replicated in step 60. The replication daemon at local data center 14A instructs utility server 18B at remote data center 14B to replicate temporary data using the client process. Remote utility server 18B execute rdist or other utilities to identify and copy the temporary data. Preferably, new, newer than previous copies, or newer than temporary data stored at another data center is copied. The temporary data is replicated to local data center 14A, another remote data center and combinations thereof.

Once the temporary data from remote data center 14A or another remote data center is transferred to other data centers, the replication daemon checks for UNIX signals in step 62. If no UNIX signals are received, the replication daemon returns to step 58 and awaits activation.

If a USR 1 or other signal designating a change in processing state is received, the replication daemon enters a sleep mode (i.e., the daemon waits for another signal) in step 64. In the sleep mode, the replication daemon continues to run but does not perform any replication. The sleep mode allows system maintenance and temporary data deletion as described below. If another USR 1 or other signal designating a change in processing state is received, the replication daemon returns to step 58 and awaits activation.

If a TERM signal or other signal designating termination of the replication daemon is received in steps 62 or 64, the replication daemon ceases operation in step 66. For example, the replication daemon finishes any unfinished replication, deletes the PID file and exits from operation.

The sleep mode discussed above may be used for deleting expired or no longer used temporary data. A Perl script or other language software for deletion is preferably separate from the replication daemon and is run on utility servers 18A and 18B for each data center 14A and 14B, respectively. Every hour, other time period, or at a triggering event, temporary files originally generated in the associated data center 14A or 14B and ready for deletion are removed. For example, temporary data created more than twenty four hours or another time period prior to the current time is deleted. Only temporary data with the appropriate prefix designating data center 14A or 14B that created the temporary data is deleted. Once deleted from the creating data center 14A or 14B, rdist as implemented with the replication daemon identifies deleted temporary data as part of the replication process. The temporary data corresponding to the deleted temporary data is removed from other data centers 14A or 14B.

In addition to replication, temporary and content data are backed up periodically, such as every night with a nightly rotation of partial, full (i.e., complete backup of part of the data), and incremental back ups. Due to the large amount of data, a seven day rotation for full back-up of portions of the data is preferably used. Preferably, seven groups of file systems are identified and each group is fully backed-up once a week on alternating nights. On any given night, the remaining groups are incrementally backed up. The back-up data is archived.

It should be understood that many changes and modifications can be made to the embodiments described above. For example, different numbers of application servers or data storage devices may be used to provide different processing and data. It is therefore intended that the foregoing detailed description be understood as an illustration of the presently preferred embodiments of the invention, and not as a definition of the invention. It is only the following claims, including all equivalents, that are intended to define the scope of the invention.

We claim:

1. A method for providing geographic data replication, the method comprising the steps of:
    (a) providing substantially the same content with first and second application servers, the first application server being geographically remote from the second application server, the first and second application servers adapted to independently process first and second user requests, respectively; and
    (b) replicating first and second sets of temporary data associated with the content and with the first and second application servers, respectively, to the second and first application servers, respectively, whereby the first application server can continue processing the second user request upon failure of the second application server and whereby the second application server can continue processing the first user request upon failure of the first application server.

2. The method of claim 1 further comprising step (c) of repeating step (b) periodically as a function of time.

3. The method of claim 1 further comprising step (c) of providing substantially the same content with a third application server, the third application server being geographically remote from the first and second application servers, the third application server adapted to independently process a third user request, and further comprising step (d) of replicating the first and second sets of temporary data to the third application server, whereby the third application server can continue processing either or both of the first and second user requests upon failure of either or both of the first and second application servers, respectively, and replicating a third set of temporary data associated with the content and with the third application server to the first and second application servers whereby either of the first and second application servers can continue processing the third user request upon failure of the third application server.

4. A system for providing geographic data replication, the system comprising:
    first and second application servers providing substantially the same content, the first application server being geographically remote from the second application server, the first and second application servers adapted to independently process first and second user requests, respectively; and
    a utility server operatively connected with the first and second application servers for replicating first and second sets of temporary data associated with the content and with the first and second application servers, respectively, to the second and first application servers, respectively, whereby the first application server can continue processing the second user request upon failure of the second application server and whereby the second application server can continue processing the first user request upon failure of the first application server.

5. The system of claim 4 wherein the utility server is operable to repeat the replication periodically as a function of time.

6. The system of claim 4 further comprising a third application server being geographically remote from the first and second application servers and providing the same content, the third application server adapted to independently process a third user request;
    wherein the utility server replicates the first and second sets of temporary data to the third application server whereby the third application server can continue processing either or both of the first and second user requests upon failure of either or both of the first and second application servers, respectively, and wherein the utility server replicates a third set of temporary data associated with the content and with the third application server to the first and second application servers whereby either of the first and second application servers can continue processing the third user request upon failure of the third application server.

7. A method for providing geographic data replication, the method comprising the steps of:
    (a) routing a first user request to a first server and routing a second user request to a second server, the first server being geographically remote from the second server;
    (b) processing the first user request at the first server and processing the second user request at the second server;
    (c) storing a first set of temporary data generated by the first user request on the first server and storing a second set of temporary data generated by the second user request on the second server; and
    (d) replicating the first set of temporary data associated with the first server to the second server such that, upon failure of the first server, the first user request can be routed to the second server whereby the second server can continue processing the first user request based on the replicated first set of temporary data received from the first server, and replicating the second set of temporary data associated with the second server to the first server such that, upon failure of the second server, the second user request can be routed to the first server whereby the first server can continue processing the second user request based on the replicated second set of temporary data received from the second server.

8. The method of claim 7 further comprising step (e) of repeating step (d) periodically as a function of time.

9. The method of claim 7 further comprising step (e) of acknowledging the replication of the first set of temporary data associated with the first server and acknowledging the replication of the second set of temporary data associated with the second server.

10. The method of claim 7 wherein step (d) comprises replicating new first temporary data associated with the first server to the second server and replicating new second temporary data associated with the second server to the first server.

11. The method of claim 7 further comprising step (e) of controlling step (d) from a data center associated with the first server.

12. A system for providing geographic data replication, the system comprising:
  (a) a first file server adapted to receive, process and store a first set of temporary data generated by a first user request;
  (b) a second file server adapted to receive, process and store a second set of temporary data generated by a second user request, the second file server being geographically remote from the first file server;
  (c) a first utility server adapted to replicate the first set of temporary data associated with the first file server to the second file server such that, upon failure of the first file server, file first user request can be routed to the second file server whereby the second file server can continue processing the first user request based on the first set of replicated temporary data received from the first file server; and
  (d) a second utility server adapted to replicate the second set of temporary data associated with the second file server to the first file server in response to initiation from the first utility server such that, upon failure of the second file server, the second user request can be routed to the first file server whereby the first file server can continue processing the second user request based on the second set of replicated temporary data received from the second file server.

* * * * *

UNITED STATES PATENT AND TRADEMARK OFFICE
CERTIFICATE OF CORRECTION

PATENT NO. : 6,411,991 B1
DATED : June 25, 2002
INVENTOR(S) : Helmer et al.

It is certified that error appears in the above-identified patent and that said Letters Patent is hereby corrected as shown below:

Column 3,
Line 24, delete "application" and insert -- Application -- therefor.
Line 25, delete "1998." and insert --1998, --therefor.
Line 25, delete "scalable" and insert -- Scalable -- therefor.
Line 34, delete "patent application" and insert -- Patent Application -- therefor.

Column 5,
Line 37, delete "1 4A" and insert --14A -- therefor.

Column 6,
Line 12, delete "1 6A" and insert --16A -- therefor.

Column 7,
Line 38, delete "patent application" and insert -- Patent Application -- therefor.

Column 12,
Line 6, delete ", file" and insert -- , the -- therefor.

Signed and Sealed this

Twenty-sixth Day of November, 2002

Attest:

Attesting Officer

JAMES E. ROGAN
*Director of the United States Patent and Trademark Office*